Nov. 28, 1961  W. A. McINTOSH  3,010,895
LIME TREATED SULFONATED LIGNIN DRILLING FLUIDS
OF THE OIL EMULSION TYPE
Filed Nov. 19, 1957
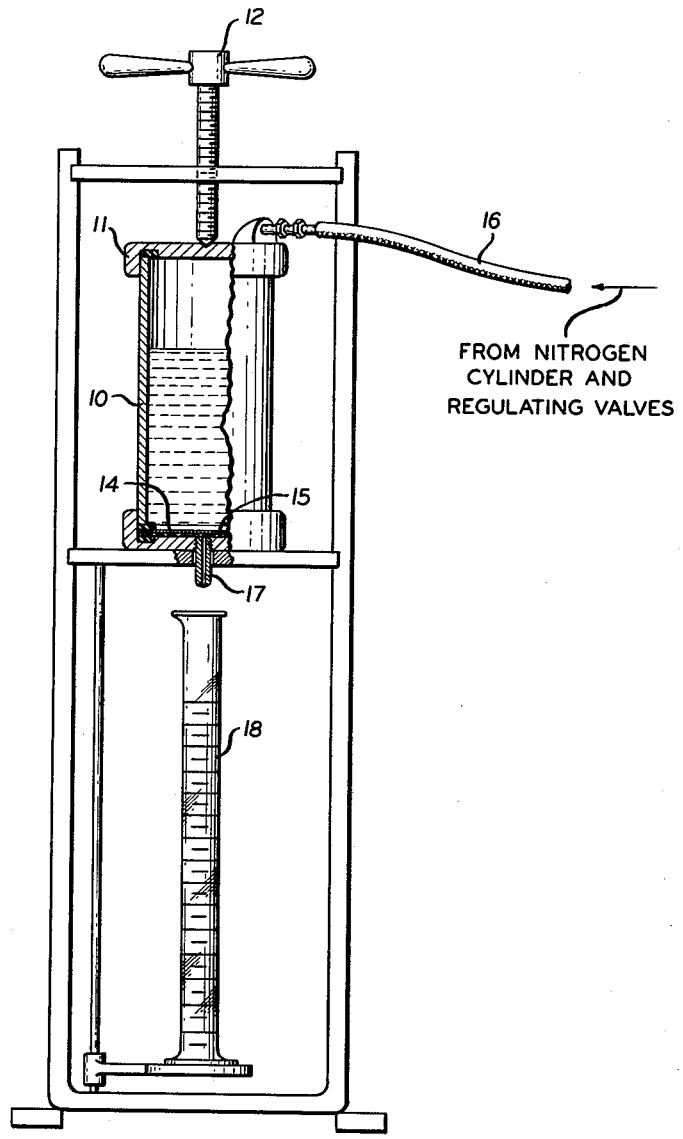
FROM NITROGEN
CYLINDER AND
REGULATING VALVES
INVENTOR
WILLIAM A. MCINTOSH
BY
*Berry & Crews*
ATTORNEYS.

United States Patent Office 3,010,895
Patented Nov. 28, 1961

3,010,895
LIME TREATED SULFONATED LIGNIN DRILLING FLUIDS OF THE OIL EMULSION TYPE
William A. McIntosh, Summerville, S.C., assignor to West Virginia Pulp and Paper Company, New York, N.Y., a corporation of Delaware
Filed Nov. 19, 1957, Ser. No. 697,387
3 Claims. (Cl. 252—8.5)

The present invention relates to drilling fluids and to methods of making same. More particularly it relates to an improved drilling fluid of the oil emulsion type, which is particularly useful for drilling either through salt formations, or for off shore drilling. To this end it should have a low fluid loss which prevents harmful action to water sensitive formations. In general, emulsions of this kind are of the oil in water type and consist of an oil such as diesel or fuel oil, a water phase preferably consisting of saturated salt brine, and an emulsifier. Clay and/or starch may be included to impart properties desired under certain special conditions.

Among the emulsifiers heretofore proposed have been calcium lignosulfonates and sodium lignosulfonates. The present invention is concerned with a drilling fluid additive having superior properties as respects stability of the emulsion and fluid retention. Such improvement is predicated upon the substitution in the formulation of a sodium-calcium lignosulfonate compound having improved emulsifying properties, together with superior fluid loss properties. The calcium lignosulfonates hitherto described have been derived from sulfite waste liquor by precipitation with lime, for example as described in U.S. Reissue Patent 18,268. The sodium lignosulfonates hitherto described are prepared from the above calcium lignosulfonates by means of a simple double decomposition reaction with sodium sulfate, in which virtually all of the calcium is replaced with sodium.

It has now been discovered that superior results will be had by reacting a sodium lignosulfonate compound in aqueous solution with lime in the hot, as for example by boiling under reflux conditions for a period of time, so as to cause the lignin molecule present to undergo reaction, whereby a mixed sodium-calcium salt of a lignosulfonic acid is obtained, the quantity of lime used being insufficient to react with all of the sulfonic groups present. Preferably also, sodium lignosulfonate is started with which has approximately two sulfonate groups per unit of 840 of the basic lignin. Contrary to either calcium lignosulfonate or sodium lignosulfonate, both of which are completely water soluble, the product of this reaction is only partially water soluble.

While it is very difficult to understand exactly what happens in the reaction of lime with sodium lignosulfonate under the conditions mentioned above, it may be presumed that a complex molecular structure is formed, in which the sodium-containing portions tend to be insoluble. As even a small amount of water is withdrawn from the emulsion, the salt concentration increases appreciably, thus decreasing the solubility of the sodium-calcium lignosulfonate, and causing it to separate in extremely fine or colloidal particles from the saturated solution thereof which give the much desired plugging action to prevent fluid loss.

For a more complete understanding of the invention, reference may be had to the following illustrative examples, together with the single figure of the drawing showing a known type of testing device for the drilling fluids produced.

EXAMPLE 1

The lignin sulfonic compound started with was derived from lignin by reaction therewith of sodium sulfite in solution until two sulfonic groups were attached to the lignin molecule of assumed 840 molecular weight. Such material is presently on the market under the name of Polyfon T. 300 grams of the above mentioned sodium lignosulfonate was dissolved in 650 ml. water in a 2000 ml. glass, 3-necked, round-bottomed Pyrex flask. One neck of the flask was fitted with a mercury seal stirrer, using water instead of mercury, and run by a variable speed electric motor. A reflux condenser was installed in the second neck and a dropping funnel in the third neck, and the flask heated by means of a thermostatically controlled heating mantle. The mixture was heated to boiling with vigorous agitation, the boiling temperature being 215° F. When the solution started to boil, 32.4 grams of lime, slurried in 50 ml. of water, was added, taking care to control foaming. After all the lime was added, the boiling was continued for approximately one hour. The reaction product was then evaporated to dryness and the residue dried in the oven at 105° C. and ground in a micropulverizer. The product of this example will be hereinafter referred to as product C and has the enhanced properties and answers the description of the sodium-calcium compound above described.

An oil emulsion drilling fluid was then made with the emulsifier so obtained as follows:

Sodium-calcium lignosulfonic product made as
    above described_____grams__ 17
Caustic soda_____do____ 2
Fuel oil_____percent__ 10–20
Saturated salt brine to make a total of 350 ml.

When 10% oil is used under the above formulation the total composition by weight is substantially, oil 10%, sodium-calcium lignosulfonate 3.76%, caustic soda .44% and brine 85.8%. When 20% oil is used the total composition by weight is substantially, oil 20%, sodium-calcium lignosulfonate 4%, caustic soda .47% and brine 75.53%. If excess foaming results in the mixing, such action may be satisfactorily controlled by the addition of a few drops of turkey red oil. A 30-minute stirring time was used. For testing purposes the test cell is assembled as shown in the drawing, with filter paper in place. The above emulsion is placed in the cell 10, the cap 11 applied and brought home by the action of the screw 12. Pressure of 100 pounds per square inch is then applied above the solution by means of nitrogen under pressure admitted through pipe 16. Fluid passing through the filter paper 14 travels through duct 17 and is caught in graduate 18. The apparatus thus far described is known as the Baroid low pressure filter press, and has been standardized by the American Petroleum Institute for the present purpose. The amount of filtrate in milliliters passing in a 30-minute period after application of the 100 pounds pressure is taken as a measure of the filter loss.

EXAMPLE 2

The same procedure was followed as in Example 1, except that instead of using sodium lignosulfonate having two sulfonic groups as the starting material, sodium lignosulfonate having one sulfonic group was used. This latter starting material is sold under the trademark "Polyfon O." The product of this example was designated "product A."

EXAMPLE 3

This example was carried out in the same manner as Example 1, using the same starting material, but the reaction was stopped immediately after lime addition by cooling, before reaction was complete. The product of this example was designated "product B."

Results

The oil emulsion drilling fluids were then prepared with the products C, A and B, as above described in connection with product C, and tested exactly as described in Example 1. The results were as follows:

| Emulsifier used: | Filtrate, ml. |
|---|---|
| Product A | 33 |
| Product B | 8 |
| Product C | 3.5 |

Thus the product of Example 1 gives the best result by showing the lowest filtration loss.

It is to be understood that various changes may occur to those skilled in the art without departing from the spirit of my invention or the scope of the claims.

I claim:

1. The method of making a sodium-calcium lignosulfonate compound characterized by a lower solubility in water than either sodium lignosulfonate or normal calcium lignosulfonate for use in a drilling fluid which consists chiefly of an oil-in-salt-brine emulsion, comprising, in combination, boiling under reflux conditions an aqueous solution of a sodium lignosulfonate containing at least two sulfur groups per molecular unit, with lime, the amount of lime employed and the time of boiling being sufficient to displace a substantial part of the sodium from the sodium lignosulfonate but being substantially short of the requirements for displacing all the sodium from the sodium lignosulfonate.

2. The product prepared according to the method of claim 1, said product having a substantially lower solubility in water than that of sodium lignosulfonate itself or calcium lignosulfonate itself.

3. A composition adapted for use in drilling operations consisting essentially of saturated salt brine 75–90%, fuel oil 10–20%, caustic soda 0.4–0.5%, sodium calcium lignosulfonate 3.7–4.0%, said sodium-calcium lignosulfonate being prepared according to the method of claim 1.

References Cited in the file of this patent

UNITED STATES PATENTS

| | | |
|---|---|---|
| 2,476,845 | Dawson | July 19, 1949 |
| 2,680,113 | Adler et al. | June 1, 1954 |
| 2,800,449 | Browning | July 23, 1957 |
| 2,898,294 | Priest et al. | Aug. 4, 1959 |
| 2,935,504 | King et al. | May 3, 1960 |